United States Patent
Sasidharan et al.

(10) Patent No.: US 9,377,839 B2
(45) Date of Patent: Jun. 28, 2016

(54) DYNAMIC BATTERY MANAGEMENT

(71) Applicant: Verizon Patent and Licensing Inc., Basking Ridge, NJ (US)

(72) Inventors: Shan K. Sasidharan, Chennai (IN); Rajesh M. Narayanan, Chennai (IN); Raghuram Ayalur Muralikrishnan, Chennai (IN); Vijayakumar Rajagopal, Dharmapuri (IN); Pulkit Jain, Delhi (IN); Sireesh Chandra Mutharaju, Chennai (IN); Sravan C. Reddy, Hyderabad (IN)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 232 days.

(21) Appl. No.: 14/094,381

(22) Filed: Dec. 2, 2013

(65) Prior Publication Data

US 2015/0153810 A1   Jun. 4, 2015

(51) Int. Cl.
| | | |
|---|---|---|
| G06F 1/26 | (2006.01) | |
| G06F 1/32 | (2006.01) | |
| G06F 9/48 | (2006.01) | |
| G06F 9/50 | (2006.01) | |
| G06F 3/0484 | (2013.01) | |

(52) U.S. Cl.
CPC ............ G06F 1/3212 (2013.01); G06F 1/3203 (2013.01); G06F 1/329 (2013.01); G06F 1/3287 (2013.01); G06F 3/04847 (2013.01); G06F 9/4893 (2013.01); G06F 9/5094 (2013.01); Y02B 60/1282 (2013.01); Y02B 60/1292 (2013.01); Y02B 60/144 (2013.01)

(58) Field of Classification Search
CPC .. G06F 9/4893; G06F 1/3212; G06F 98/5094
USPC .......................................................... 713/320
See application file for complete search history.

(56) References Cited

U.S. PATENT DOCUMENTS

| | | | | |
|---|---|---|---|---|
| 6,148,408 A * | 11/2000 | Shimoda | ............... | G06F 1/3203 713/300 |
| 8,466,857 B2 * | 6/2013 | Yamaguchi | .............. | G09G 3/20 345/211 |
| 2003/0135288 A1 * | 7/2003 | Ranganathan | ........ | G06F 1/3203 700/22 |
| 2009/0098914 A1 * | 4/2009 | Martin-Cocher | . | H04W 52/0261 455/572 |
| 2012/0297215 A1 * | 11/2012 | Saba | ....................... | G06F 1/3203 713/320 |
| 2012/0299941 A1 * | 11/2012 | Lee | ....................... | G09G 3/3406 345/582 |
| 2013/0106810 A1 * | 5/2013 | Kim | ....................... | G06F 1/3265 345/204 |
| 2013/0321477 A1 * | 12/2013 | Gandhi | ................ | G09G 3/2022 345/690 |

(Continued)

*Primary Examiner* — Thomas Lee
*Assistant Examiner* — Volvick DeRose

(57) ABSTRACT

Systems and methods for dynamic battery management of mobile devices are disclosed. In some implementations, a battery management application at the mobile device can enable a user to configure operational priority values for one or more software applications installed on the device, a battery threshold value for the mobile device and device resources needed by prioritized applications. In some implementations, mobile devices across a network can be managed remotely through a device management application. The device management application can obtain operational priority values for one or more software applications executing on one or more devices. The device management application can identify respective battery thresholds for the devices and remotely control operation of the software applications based on their respective operational priorities and the identified battery thresholds.

18 Claims, 13 Drawing Sheets

(56) References Cited

U.S. PATENT DOCUMENTS

2014/0006809 A1* 1/2014 Udeshi .................. G06F 9/5094 713/300

2014/0347378 A1* 11/2014 Mukai ................. F24F 11/0086 345/531

* cited by examiner

DYNAMIC BATTERY MANAGEMENT

BACKGROUND

Mobile devices such as smart phones and tablets are increasingly used by businesses to service their organization and customers. These devices typically run software applications that perform functions critical to operations of a business. While it is important to keep such applications operating without interruption, devices on which these applications operate are susceptible to varying battery consumption patterns. These varying battery consumption patterns, resulting from differing application resource requirements, often jeopardize operational continuity of business critical applications. For example, battery life of a tablet computer varies significantly depending on the number and type of applications running on the tablet computer. With or without the knowledge of a user, such as a field worker, unnecessary battery drain and premature device shutdown may be caused by unused or unwanted applications. This not only affects the operational continuity of other critical applications, but also hampers efficiency of the user, thereby affecting an organization's performance.

As the foregoing illustrates, a new approach for managing battery on mobile devices may be desirable.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1:
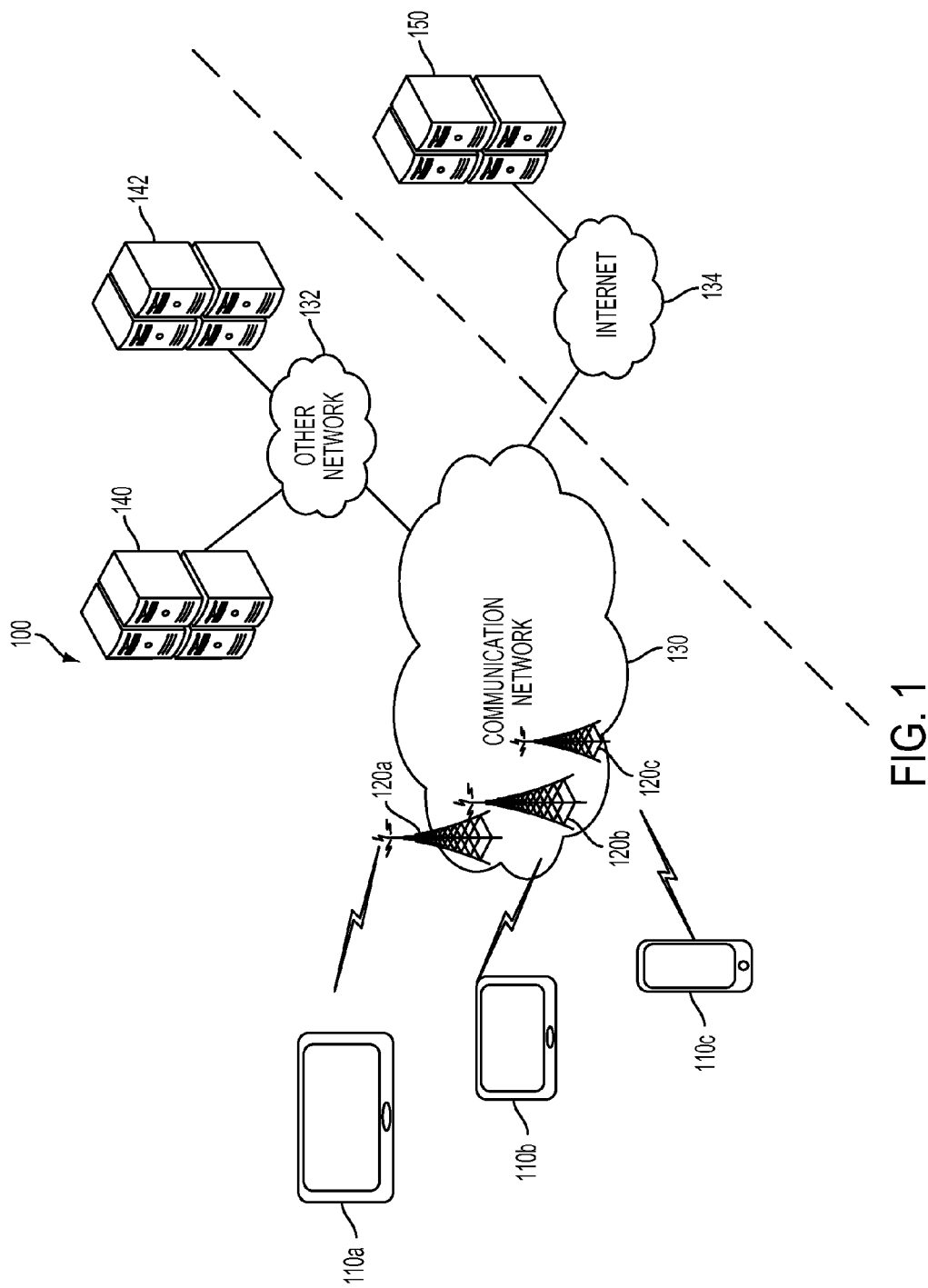
FIG. 1 illustrates an exemplary communication network environment for providing dynamic battery management for a mobile device.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

The subject technology provides techniques for dynamic battery management on mobile devices.

In an implementation, a battery management application is provided at a mobile device (e.g., smart phone, tablet computer). The battery management application can enable a user to configure operational priority values for one or more software applications installed on the mobile device. Such operational priority values may indicate perceived operational importance of the software applications to the user. The battery management application can also enable the user to configure a battery threshold value for the mobile device. Some implementations can enable a user to configure device resources (e.g., GPS, WiFi) needed by prioritized applications. For example, a user may indicate that WiFi hardware should be turned off for an application when the battery level of the device falls below a threshold value. In some implementations, when the battery level of the mobile device falls below the threshold value, the mobile device is configured to transition to a dynamic battery management mode. In a dynamic battery management mode, resources available to the software applications can be automatically controlled based on respective application priority values. Furthermore, some executing applications may be terminated based on their respective operational priority values. Example application resource management and dynamic battery management scenarios are discussed in detail further below.

In an implementation, mobile devices across a network can be managed remotely through a device management application that may reside at a remote server. The device management application at the remote server can obtain operational priority values for one or more software applications executing at one or more devices. The device management application may identify a battery level and battery threshold for a device and remotely control operation of software applications executing at the device based on their respective operational priorities and a battery threshold. These operational priority values and the battery threshold may be provided by a user through the battery management application discussed above.

In an implementation, the device management application may include a management dashboard that provides operational information regarding mobile devices being used across a network (e.g., field devices). Such operational information can include, but is not limited to, device battery levels, a list of executing applications and an indication of whether a dynamic battery management plan is engaged for a device. As an example, the management dashboard can be monitored and interacted with by an administrator. The administrator can be, for example, enabled to provide instructions that control operation (e.g., terminate unused applications) across a plurality of mobile devices based on at least their respective battery levels. Remote mobile device management is discussed in detail further below.

Reference now is made in detail to the examples illustrated in the accompanying drawings and discussed below. An exemplary communication network environment 100 is described initially with respect to FIG. 1. The network environment 100 provides a variety of communication services between different client devices and servers, including dynamic battery management instructions for different client application programs executable at a mobile devices 110*a-c* (e.g., smart phones, tablet computers).

Following the description of network environment 100, network systems and processes related to dynamic battery management for mobile devices will be described in further detail below using the examples illustrated in FIGS. 2-11. However, it should be noted that the subject technology is not intended to be limited to these examples. For example, the subject technology is not limited to mobile devices 110a-c and can operate with any number of mobile devices, servers and networks. While the following disclosure is discussed generally with reference to mobile device 110a, it is to be appreciated that the implementations are applicable to mobile devices 110b and 110c.

As will be described in further detail below, dynamic battery management may be provided to users of the mobile devices 110a-c as part of a service hosted at a server through a mobile communication network 130. For example, the service may be provided to the mobile device 110a user by a wireless carrier or operator of mobile communication network 130 via an interface at the mobile device 110a. The mobile device user in this example also may be a subscriber of various communication services provided by the wireless carrier through the mobile communication network 130 to the user's mobile device 110a. The dynamic battery management functionality may also be provided to a user of the mobile device 110a as a service hosted on the mobile device 110a in communication with a mobile communication network 130, or by some combination of hosting on the mobile device 110a and server. In a further example, the interface may be a client application executable at the mobile device 110a that configures the mobile device 110a to communicate with an associated application server through the mobile communication network 130. The communication from the mobile device 110a may include one or more application operational priority levels and a battery threshold value of the mobile device 110a. The battery threshold may be provided by a user of mobile device 110a and can indicate an initial threshold at which dynamic power management may be initiated. The battery threshold may be associated with a particular operational priority level of an application (e.g., a lowest priority application). Other applications may have their own operational priority levels that may be associated with respective battery thresholds. Battery thresholds are discussed further below.

In some implementations, a battery management application is provided at the mobile device 110a. The battery management application at the mobile device 110a enables a user to configure operational priority levels for one or more software applications installed on the mobile device 110a. The operational priority levels may be based on perceived importance of the applications to the user. For example, a customer messaging application may be more important to a user than a streaming video application. In a non-limiting aspect, applications which are not assigned operational priority levels may be considered to be non-priority applications. In some implementations, perceived importance of an application to a user may be determined based on the number of times an application is selected or used by a user. In other implementations, the priority values may be based on application parameters including, but not limited to, the type of application (e.g., messaging, word processing, video player, etc.), the resource requirements of the application (e.g., memory, data input/output), Internet connectivity requirements, Bluetooth usage requirements and any other resources and/or data that may be be needed for operation of an application. In some implementations, the priority value may be a number, alphabet or any other alpha-numeric character(s). The priority value may be suggested by a user through a user interface of the user's device. The priority value may be determined automatically by the device based on the application parameters discussed above or determined at a server and remotely transmitted to the device. In some implementations, operational priority values for each application may vary based on application use or any other application parameter discussed above. Operational priority values for two or more applications may vary together or vary in synchronization with each other. Operational priority values may also be computed as function of one or more of the application parameters discussed above. Operational priority values are discussed further below.

In the example illustrated in FIG. 1, the network environment 100 includes a mobile client device 110a, which transmits requests to one or more servers 140, 142 and/or 144 through a communication network 130 via base station 120a. Communication network 130 can interconnect with other networks such as network 132 and the Internet 134. As noted above, network environment 100 as illustrated in FIG. 1 can be used to provide a variety of communications, including communications for dynamic battery management by controlling operations of one or more application programs executable at mobile device 110a.

For example, mobile device 110a can be configured to execute a client battery management application that communicates with a mobile device management application hosted at, for example, server 140. In this example, mobile device 110a communicates through communication network 130 with server 140 to provide one or more application operational priority values and battery threshold to the server 140. Further, the server 140 may send a request for such device specific information at preconfigured intervals or at the request of an administrator at the server 140. Example operations of mobile device 110a during dynamic battery management will be described in detail further below.

Server 140 can be configured to control various operations of mobile devices 110a-c through a local area network or wide area network such as the Internet (134). For instance, in response receiving a battery threshold for mobile device 110a, the server 140 may send instructions to terminate one or more unused or unnecessary applications executing at the mobile device 110a. To provide one or more instructions to the mobile device 110a, server 140 may access a local database or file system or may obtain information provided by other servers, via network 132, such as server 142, or via the Internet (134), such as server 150. Server 140 uses such information to formulate instructions based on the determined state of the mobile device 110a. Server 140 may transmit the response to mobile device 110a causing the mobile device to terminate or modify operation (e.g., hardware resource usage) of one or more applications executing at the mobile device 110a.

Communication network 130 of network environment 100 facilitates communications between various types of client devices and at least one server for purposes of dynamic battery management of the client devices through a mobile device management application hosted at the server and battery management application hosted at respective client devices. Such functionality can be implemented in the form of an automated interface including one or more processing functions accessible to mobile device 110a, as described further below. In some implementations, network 130 is a mobile communication network that supports communications for different mobile devices or other types of computing devices in addition to devices that execute client applications and participate in services hosted by servers 140 and/or 142. Network 130 can thus be any network or combination of networks in an overall communication network for transmitting data communications between various devices associated with the communication network.

Network 130 can include, but is not limited to, a wired (e.g., Ethernet) or a wireless (e.g., WiFi or 4G) network. In addition, network 130 can include a local area network, medium area network, and/or wide area network. Network 130 can support protocols and technology including, but not limited to, Internet or World Wide Web protocols and communication services. Intermediate network routers, gateways, or servers may be provided between the network components/devices of network environment 100 as may be desired in some implementations of network or computing environments.

While the example in FIG. 1 shows only mobile devices 110a-c, the network environment 100 can be used to facilitate data communications for additional devices (not shown) over communication network 130. Similarly, network environment 100 can include other servers (not shown) in addition to servers 140, 142 and 144 for communicating with one or more of the mobile devices. Furthermore, the subject technology may be implemented in communication network 130 using any of a variety of available communication networks. As such, FIG. 1 is used herein to provide only a very simplified example of a few relevant elements of network environment 100 including communication network 130, for purposes of discussion and explanation of the subject technology.

In the example shown in FIG. 1, mobile device 110a is configured to access mobile wireless communication services through network 130, for example, via a base station 120a. In another example, the services may be hosted on the mobile device 110a itself and the mobile device 110a may carry out some or all of the steps described above as being carried out by server 140. Mobile device 110a is intended to provide just one example of a type of device that may be used for communicating with a web service hosted at server 140. Mobile device 110a can be any type of mobile computing device that is capable of data communications over one or more networks and that includes drivers, sensors and services for detecting device parameters such as battery levels. Examples of such a mobile computing device include, but are not limited to, mobile handsets, cellular smart phones, and tablet computers. An example of a mobile device for implementing the above-described dynamic battery management will be described further below in reference to FIG. 10.

Figure 2:
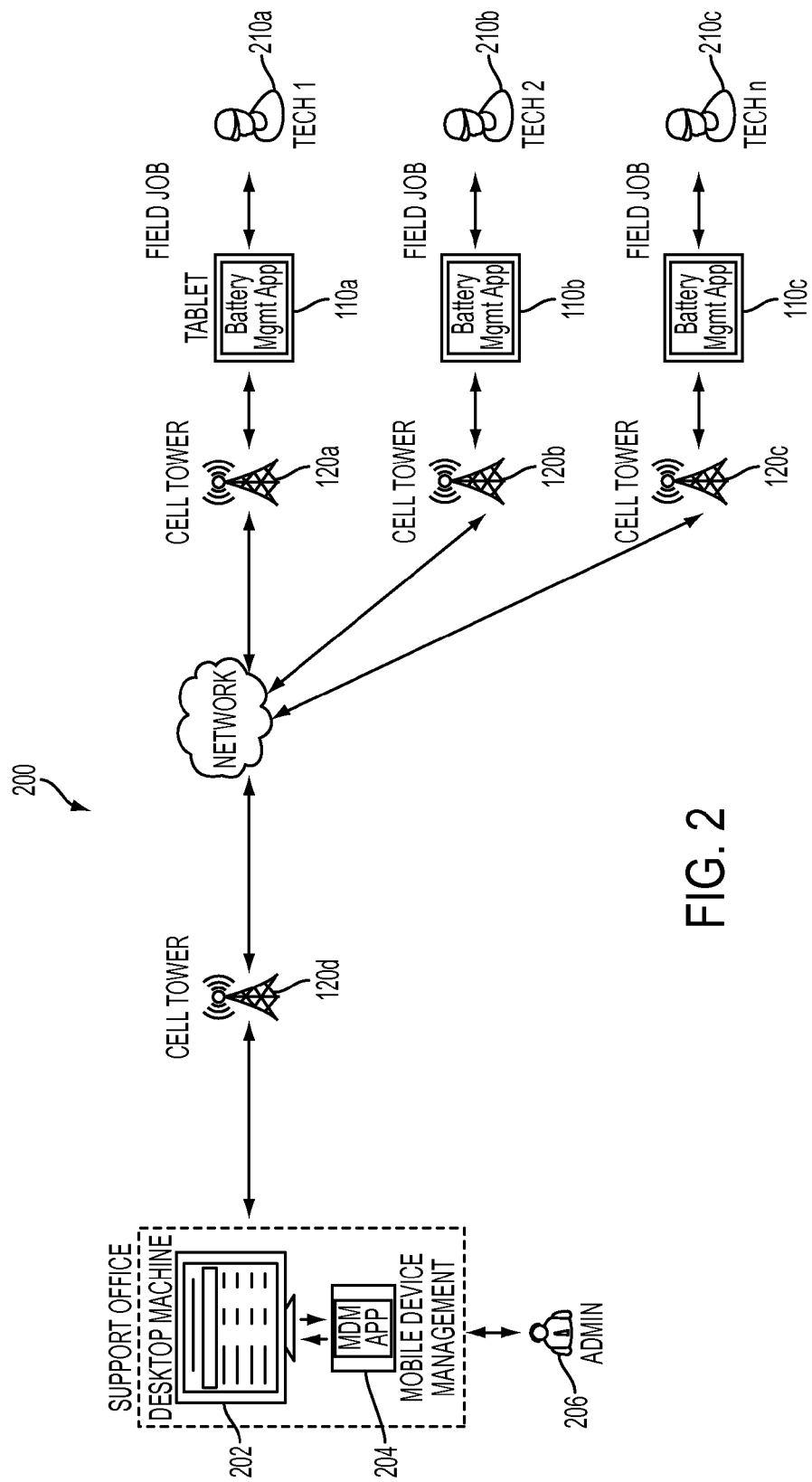
FIG. 2 illustrates an example environment for remote dynamic battery management.

FIG. 2 illustrates an example environment 200 for remote dynamic battery management across an organization, according to an implementation. As discussed above, there may be a number of mobile devices in use across a networked organization. Remote dynamic battery management can enable an administrator to monitor and manage battery usage across such devices. In an embodiment, a device management application at a remote server can obtain operational priority values for one or more software applications operating on a device, identify a battery threshold for the device and remotely control operation of the software applications based on their respective operational priorities and the identified battery threshold.

In some implementations, separate battery thresholds can be associated with each application priority level. For example, when the battery threshold falls below 40% of full battery power, dynamic power management is initiated and a first application having a priority level of 5 may be the first application to be resource managed (e.g., Bluetooth access disabled). When the battery threshold falls below 30%, the first application may be terminated and a second application having a higher priority level of 4 may be resource managed. Then, when the battery threshold falls below 20%, a third application having a much higher priority level of 3 may be resource managed and the second application may be terminated. In this way, each operational priority level of an application may be associated with a separate battery threshold level. When the battery level falls below a threshold associated with a particular operational priority level, an application having the particular priority level may be resource managed and an application having a lower priority level than the particular priority level may be terminated.

Referring to example environment 200, device management application 204 includes a battery management dashboard 202. Battery management dashboard 202 can provide operational information regarding mobile devices 110a-c being used by respective field technicians 210a-c. Such operational information can include, but is not limited to, device battery levels, device location, a list of running applications and an indication of whether a dynamic battery management plan is engaged for a particular one of the devices. An administrator 206 may control battery management functions of mobile devices 110a-c using battery management dashboard 202.

Figure 3:
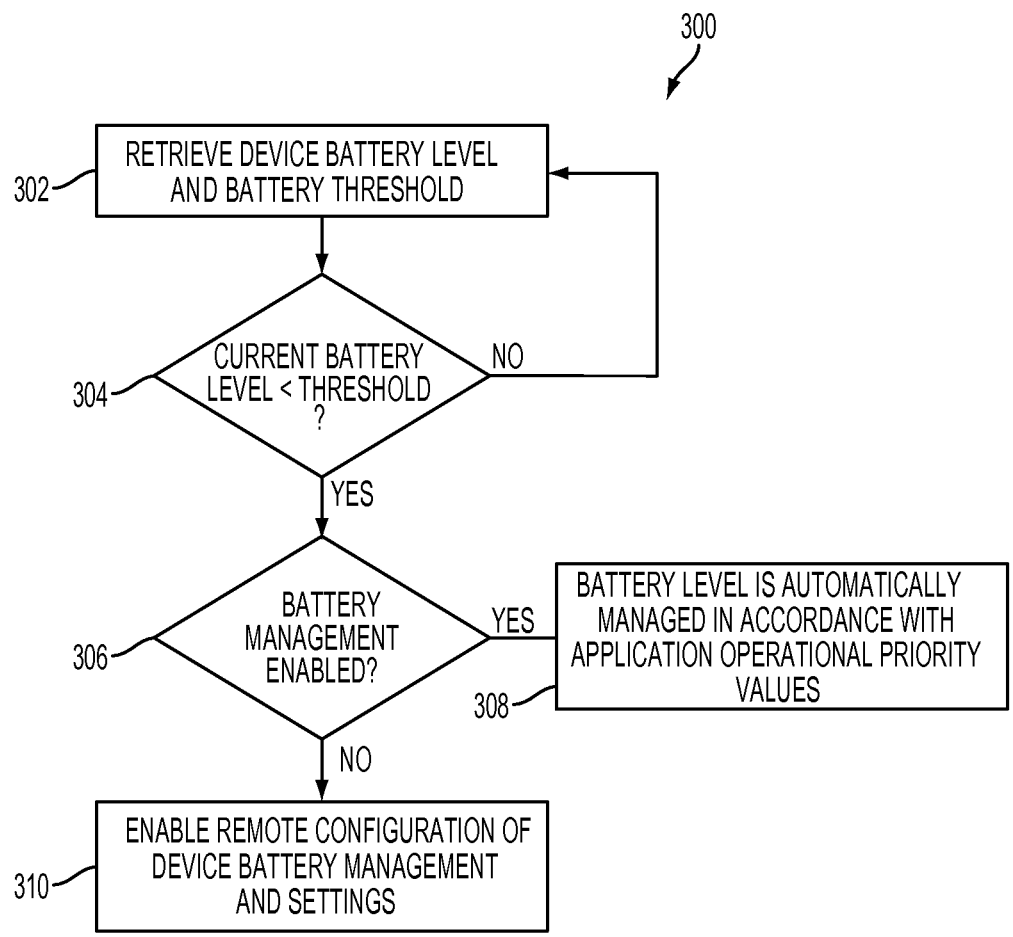
FIG. 3 illustrates an example process for remote dynamic battery management of a mobile device.

FIG. 3 is a process flowchart of an example method 300 for remote dynamic battery management functionality of a mobile device. For purposes of discussion, method 300 will be described using system 100 of FIG. 1, as described above, but method 300 is not intended to be limited thereto. The steps of method 300 may be performed by mobile device 110a in combination with server 140.

As shown in FIG. 3, method 300 begins in step 302, which includes retrieving device battery level status, including a battery threshold, from a mobile device (e.g., device 110a). As an example, the retrieval of device battery level status, including a battery threshold for mobile device 110a can be performed by server 140. To retrieve such information from mobile device 110a, an administrator may select a user interface icon indicative of mobile device 110a from battery management dashboard 202. When the user interface icon is selected, the server 140 may proceed to retrieve the device battery level status, including a battery threshold, from mobile device 110a. In some implementations, server 140 may retrieve the device battery level status and battery threshold prior to selection of the user interface icon. For example, server 140 may automatically query or poll mobile devices 110a-c at predetermined intervals to retrieve their respective device battery level status and battery thresholds.

In a first example, a device that requires usage of applications that rapidly consume battery may have a higher battery threshold level (e.g., 70% of full battery level). This is because dynamic battery management may need to resume earlier (e.g., at 70% of full battery level) to ensure that such applications, that consume battery level at a rapid rate, remain operating for a longer period of time. Conversely in a second example, a device that requires usage of applications that less rapidly consume battery may have a lower battery threshold level (e.g., 50% of full battery level). This is because dynamic battery management can resume later (e.g., at 50% instead of 70% of full battery level) to ensure that such applications that less rapidly consume battery level remain operating for the same longer period of time as the first example.

Returning to method 300, the battery threshold level for the mobile device is then compared to the device's real-time or current battery level (step 304). If it is determined that the battery level is below the battery threshold for the device (Yes, step 304), then method 300 checks if dynamic battery management is enabled for the device (step 306). If it is determined that the real-time battery level is equal to or greater than a threshold (No, step 304), then method 300 returns to step 302.

If dynamic battery management is enabled for the device (Yes, step 306) then battery level is automatically managed by the device in accordance with application operational priority levels (step 308). Such automatic battery management can control operation of the software applications based on their respective operational priorities. Operational priority levels may be assigned to applications based on their perceived importance to the user or user's organization. For example, a user may assign a higher operation priority value to a business critical application and a lower application priority value to a video player that may be executed on a mobile device. Furthermore, different device may have different operational priority values for the same application, especially when the devices are being operated by different users. Also, for example, non-priority applications may be terminated when the device enters a dynamic battery management mode.

If dynamic battery management is not enabled for the device (No, step 306), then an administrator is enabled to remotely configure battery level settings for the mobile device (step 310). In an example aspect for remote management, a human administrator may be provided with a device management application. The device management application can include a management dashboard that provides operational information regarding mobile devices being used across a network (e.g., field devices). Such operational information can include, but is not limited to, device battery levels, a list of running applications and an indication of whether a dynamic battery management plan is engaged for a device.

As an example, the management dashboard can be monitored by the administrator. The administrator can be, for example, enabled to provide instructions that control operation (e.g., terminate unused applications) across a plurality of mobile devices based on at least their respective battery levels. In an example scenario, if battery level of a mobile device operated by a user (e.g., field technician) falls below a threshold, an administrator can remotely initiate dynamic battery management for the user's device.

In this way, the user is able to continue use of his or her device for an extended period of time. This results in improved business continuity for the user and also the user's organization.

Figure 4A:
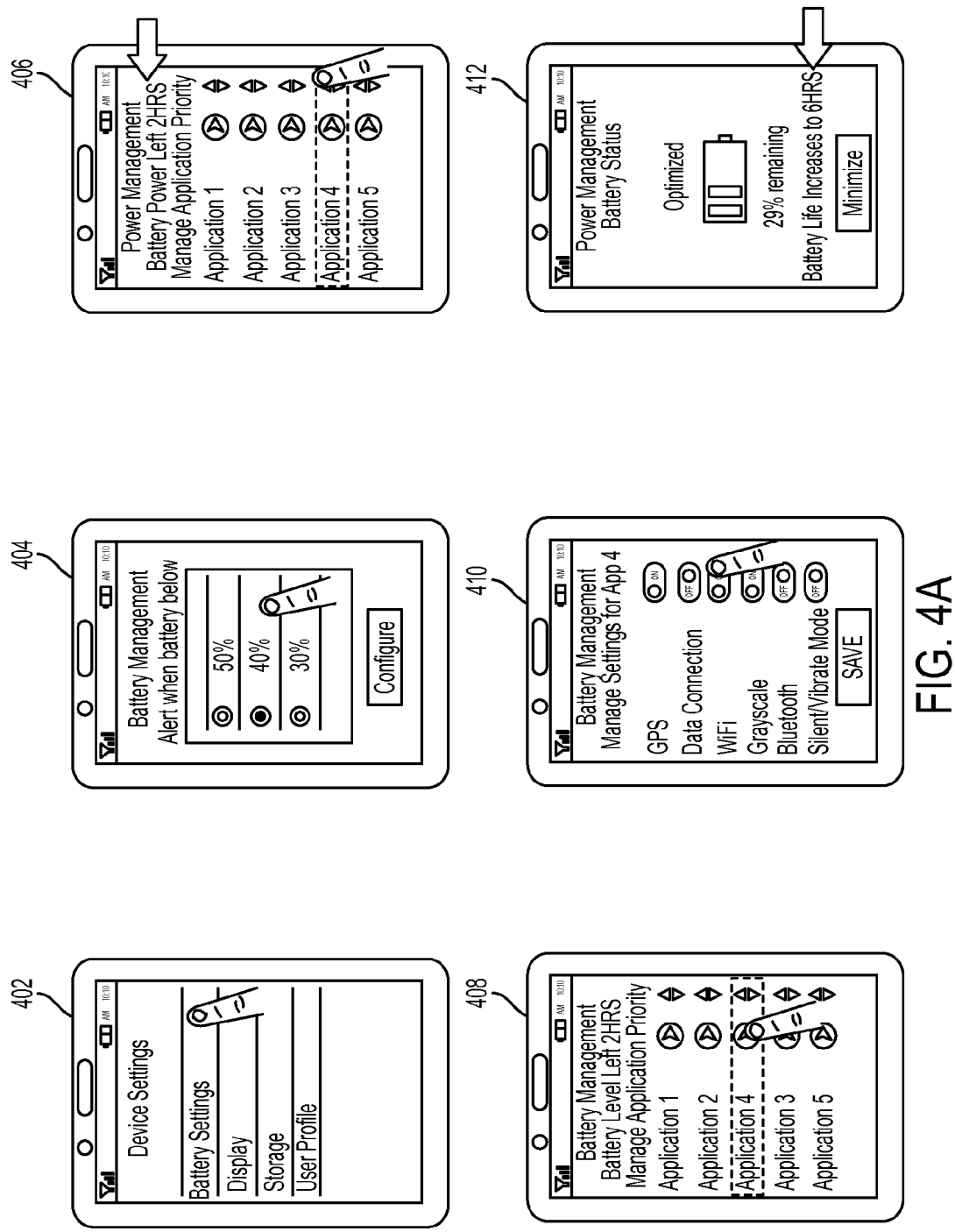
FIG. 4A illustrates example interface scenarios for a battery management interface.

FIG. 4A illustrates example interface scenarios for a battery management application at a mobile device (e.g., mobile device 110a) in accordance with the disclosed teachings. Interface 402 illustrates a user selecting (e.g., selecting through a touch gesture) "Battery Settings" for the mobile device causing the battery management interface 404 to instantiate. The battery management interface 404 enables the user to select a battery level threshold or warning level after which a dynamic battery management mode can be initiated for the device. In this example, the user selects the threshold to be 40% of full battery level. In other words, when the battery level drops to 40% of its full operational capacity, the user may be provided with a warning that the device is entering a dynamic battery management mode and any applications executing on the mobile device may be subsequently controlled based on their respective operational priority levels.

The user may select the threshold based on the user's knowledge of application usage patterns. For example, if the user uses several critical applications that rapidly consume battery, the user may select a higher battery threshold level (e.g., 70% of full battery level). This is because dynamic battery management may need to resume earlier (i.e., at 70% of full battery level) to ensure that such applications consuming battery level at a rapid rate remain operating for a longer period of time. Conversely, when the user requires usage of critical applications that less rapidly consume battery, the user may select a lower battery threshold level (e.g., 50% of full battery level). This is because dynamic battery management can resume later (i.e., at 50% of full battery level) to ensure that such applications that less rapidly consume battery level remain operating for the same longer period of time.

In some implementations, server 140 or mobile device 110a may recommend a threshold level to the user. Such a recommendation may be based on previously selected threshold values or based on a determination of rate of battery consumption of one or more applications being executed on mobile device 110a. Also, for example, server 140 may store application usage patterns for one or more devices along with battery level consumption and threshold values. Such stored patterns and usage values may be used to recommend a threshold value based on an analysis of the stored data by server 140. In other implementations, server 140 may automatically determine and use a threshold value for dynamic battery management based on previously selected threshold values or based on a determination of rate of battery consumption of one or more applications being used by a user. For example, if it is determined by server 140 that a user is frequently selecting a battery threshold value of 40%, server 140 may use the threshold value of 40% for future dynamic battery management without requesting a threshold input from the user.

Application priority interface 406 enables the user to assign operational priority levels to applications based on their perceived importance to the user or user's organization. As an example, the user can gesture to move up or down each individual application (e.g., by touch gesture) in a displayed list. This causes the applications to be ranked or prioritized according to their need or perceived importance. In an example aspect, applications may be terminated or resource managed in order of increasing priority. In other words, for example, applications having lower priority values may be terminated prior to applications having higher priority values. For example, consider a scenario where a first application has a priority level of 3 and second application has a lower priority level of 4 compared to the higher priority level 3 of the first application. When a battery level reaches a predefined threshold (e.g., 40% of full battery level), the application having a lower priority level of 4 would be terminated prior to first application has a priority level of 3 and after any resources (e.g., WiFi, 3G/4G data, GPS, display brightness, Bluetooth) associated with the second application have been terminated. Referring to interface 408, Application 4 has been moved up a single priority level from its earlier application priority level illustrated in interface 406. Application 4 now has higher operational priority than Applications 3 and 5. In a non-limiting aspect, an application having the highest priority (e.g., Application 1) can be the last application to be terminated when the device completely runs out of battery level.

In some implementations, separate battery thresholds may be associated with each application priority level. An initial battery threshold at which dynamic power management is to be initiated may be provided by a user through interface 404. This battery threshold level may be associated with an application having a lowest priority value (e.g., Application 5). Battery thresholds associated with other higher priority applications (e.g., Applications 4, 3, 2 and 1) may be automatically determined by a dynamic battery management engine and may be configured at different percentage intervals (e.g., 30%, 20%, 10%, 5% etc.) for respective application priority values.

For example, referring to interface 406, when the battery level falls below the battery threshold of 40% of full battery power, dynamic power management is initiated and Application 5 having a priority level of 5 can be the first application to be resource managed (e.g., Bluetooth access disabled). When the battery level falls below 30% of full battery power, Application 5 may be terminated and application 4 having a priority level of 4 may be resource managed. Then, when the battery level falls below 20% of full battery power, Application 3 having a priority level of 3 may be resource managed and Application 4 may be terminated. In this way, each operational priority level of an application may be associated with a separate battery threshold. When the battery level falls below a threshold associated with a particular operational priority level, an application having the particular priority level may be resource managed and an application having a lower priority level than the particular priority level may be terminated. It is to be appreciated that battery thresholds for each application may be provided by a user, automatically determined by the dynamic battery management engine, provided remotely by an administrator or even determined automatically at a server and provided remotely over a network to a mobile device.

In some implementations, the operational priority value of an application may vary. For example, the operational priority value of an application may increase automatically when the user increases use of the application. Conversely, the application priority value of the application may decrease based on a reduced use of the application. In some implementations, two or more applications may increase or decrease in application priority together based on determining use of any one of the applications. In some implementations, the two or more applications may increase or decrease in priority together based on their similarity of operational purpose when any one of the applications changes in priority. For example, two chat applications may have their operational priority values increase when one of the chat applications is increasingly used by the user. This is because both applications have a similar operational purpose, i.e., chat.

In some implementations, when an application is terminated based on the application's operational priority, other operational priority values or other applications may change automatically. For example, some applications may be promoted with respect to their operational priority values, other applications may be demoted with respect to their operational priority values. For example, if there are 5 priority applications having operational priority values of 1 through 5 and if an application having priority level of 5 is terminated, a non-priority application may be automatically promoted to the list of priority applications. For example, the non-priority application may now be considered a priority application having an operational priority level of 5. In another example, if an application having a priority level of 3 is terminated, the application having the priority level of 4 may be promoted to operational priority level 3. Other applications may be promoted accordingly. In some implementations, when a user marks removes (e.g., by a user interface selection) any application from a list of priority applications, a non-priority application (that is not on the list of priority applications) may be automatically promoted to the list of priority applications.

In some implementations, a user may be able to select different thresholds for different groups of applications and/or resources needed by an application on a mobile device. For example, a first threshold value (e.g., 50% of full battery level) may be associated with all video player applications executing on a mobile device. In this way, when the threshold is reached the video player applications executing on the mobile device may be terminated. Similarly, a second threshold value may be associated with all messaging applications executing on the mobile device. In this way, when the second threshold (e.g., 30% of full battery level) is reached the messaging applications executing on the mobile device may be terminated. In this way, a user may be able to select different thresholds for different groups of applications and/or resources needed by an application on a mobile device. Furthermore, the user may be able to re-activate particular groups of applications and/or hardware resources after they have been terminated based on their respective thresholds. Such functionality provides the user with better control of device battery management.

In some implementations, operational priority values of one or more applications may be monitored and dynamically altered based on one or more operational parameters (e.g., frequency of use, application functionality, etc.) associated with the applications. For example, the operational priority level of the Application 5 may be automatically changed by a dynamic battery management engine from priority level 5 to priority level 1. Similarly, operational priority value of Application 1 may be changed from priority level 1 to priority level 5. When operational priority levels change, one or more applications may be removed or added to the list of priority applications. For example, as discussed above, a non-priority application may be automatically promoted to the list of priority applications. Operational priority values may change in any order during operation of a mobile device. For example, an application having a priority level of 2 may be automatically promoted to priority level 1. In some implementations, operational priority values of applications may be reset to their initial user defined priority levels upon user intervention through a user interface or even after detecting battery charging of a mobile device.

In some implementations, a user may be able to select a different battery threshold for each application. For example, an application may be terminated when a battery level falls below a first battery threshold (e.g., 30% of full battery level). Another application may be terminated when the battery level falls below a second battery threshold (e.g., 40% of full battery level). Battery thresholds associated with each application may vary. For example, when a low priority application is terminated, the battery threshold associated with another priority application may increase (e.g., increase from 30% to 40% of full battery level). In some implementations, a battery threshold associated with an application may increase or decrease based on use of the application or any other application parameter and hardware resources needed by the application. For example, if an application is known to consume Bluetooth resources that drain a battery level at a rapid rate, then the application may have a higher battery threshold in comparison to other applications. Bluetooth use of the application may be terminated when the battery level falls below the application's battery threshold. This can conserve use of the battery for other applications.

Mobile device hardware resources typically consume a battery only when they are actively being used by software applications. For example, battery may be consumed by a Bluetooth transmitter when the transmitter is being used to transmit and receive data over Bluetooth. Accordingly, in some implementations, when use of a particular hardware resource by an application is terminated, access to the hardware resource by the application is blocked by a dynamic battery management engine. In this way, the application can no longer access and use the particular hardware resource while allowing other un-blocked applications to continue accessing the hardware resource. For example, referring to interface 406, when the battery threshold falls below 40%, application 5 may no longer have access to Bluetooth hardware. This may reduce an overall rate of battery consumption for a device because Bluetooth can now be used by a lesser number of applications on the device. However, other higher priority applications (e.g., Applications 1 through 4) may still be able to use the Bluetooth hardware.

In some implementations, when the battery begins re-charging after the device is connected to a power source, any terminated priority applications may be automatically executed (or brought to operation) based on their respective operational priority values. For example, an application having a high operational priority value with respect to other applications may be brought back to operation prior to the other applications. In other words, terminated applications may be brought to operational status again in order of decreasing operational priority values and beginning with an application having a highest operational priority value.

In some implementations, server 140 may transmit operational priority values for one or more applications to mobile device 110a. Server 140 may also transmit battery thresholds for the applications. Server 140 may determine a battery level of the device 110a and modify one or more operational priority values and/or battery thresholds based on the battery level.

In some implementations, applications that do not appear in the application priority list are considered to be non-priority applications and may be terminated immediately when the device enters a dynamic battery management mode. In some implementations, a user can have an option to override a dynamic battery management mode and execute any application(s) when their use may be required. As an example, a user may be provided with an option to override the dynamic battery management mode when the device is about to enter a dynamic battery management mode or after the device has entered a dynamic battery management mode. Such an option may be presented as an action button through a user interface of the mobile device. As an example, when the user selects the action button, instructions are provided to a dynamic battery management engine in the mobile device to override the dynamic battery management mode. The dynamic battery management engine in the mobile device then proceeds to stop initiation or suspends the dynamic battery management mode. In a non-limiting aspect, once battery threshold and application priority settings have been configured by the user, dynamic battery management of the device is automatically handled by a battery management engine operating on the device, in accordance with the configured settings. An example battery management engine according to an implementation is discussed further below.

Returning to FIG. 4A, interface 410 illustrates management of resource settings for Application 4. In this example, the user has turned off or disabled GPS, Bluetooth and vibration alerts for Application 4. By doing so, the device has been instructed to terminate use of these resources by Application 4 when the device may enter a dynamic battery management mode. In this way, by disabling one or more resources that may be used by applications, some of the device battery level can be saved and the rate of battery consumption can be optimized. Interface 410 illustrates an example scenario where battery life is indicated on the screen as being increased from 2 hours of battery life to 6 hours of life after management of resource settings though interface 408. As an example, such estimation of battery life change may be done based on calculating a rate of battery level consumption of the mobile device. For example, if prior to dynamic battery management, battery level was being consumed at the rate of 10% per hour and after dynamic battery management the battery level is being consumed at a reduced rate of 5% per hour, the battery life of the mobile device may increase in proportion to the rate of decrease in battery level consumption. For example, in this scenario, because the rate of battery consumption has been halved (e.g., from 10%/hr to 5%/hr) the remaining battery life may double, for example, from 2 hours of remaining battery life to 4 hours of remaining battery life. This change can be displayed through interface 408 and can indicate a benefit of dynamic battery management to the user.

Figure 4B:
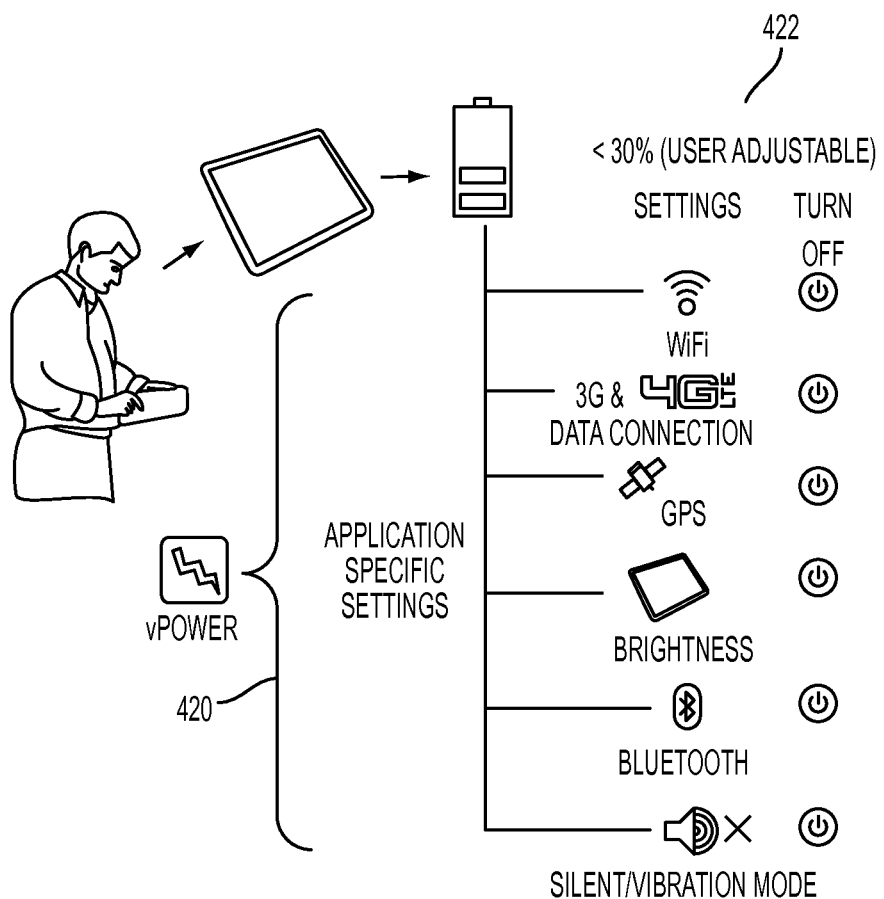
FIG. 4B illustrates example configurable application settings for a mobile device.

FIG. 4B illustrates a list of example application settings 420 for a mobile device that can be configured by a user or remotely by an administrator through a device management dashboard. Example settings may include, but are not limited to, enabling and disabling WiFi, 3G/4G data, GPS, display brightness, Bluetooth, and device vibration alerts. FIG. 4B also illustrates battery level 422 with an example user adjustable battery threshold (e.g., 30%). In an example aspect, when the device battery level reaches or falls below a battery threshold set by the user or a remote administrator, the mobile device transitions into a dynamic battery management mode and applications are controlled in accordance with their operational priority levels. In some implementations, applications that do not appear in an application priority list are considered to be non-priority applications and be terminated immediately when the device enters the dynamic battery management mode.

Figure 5:
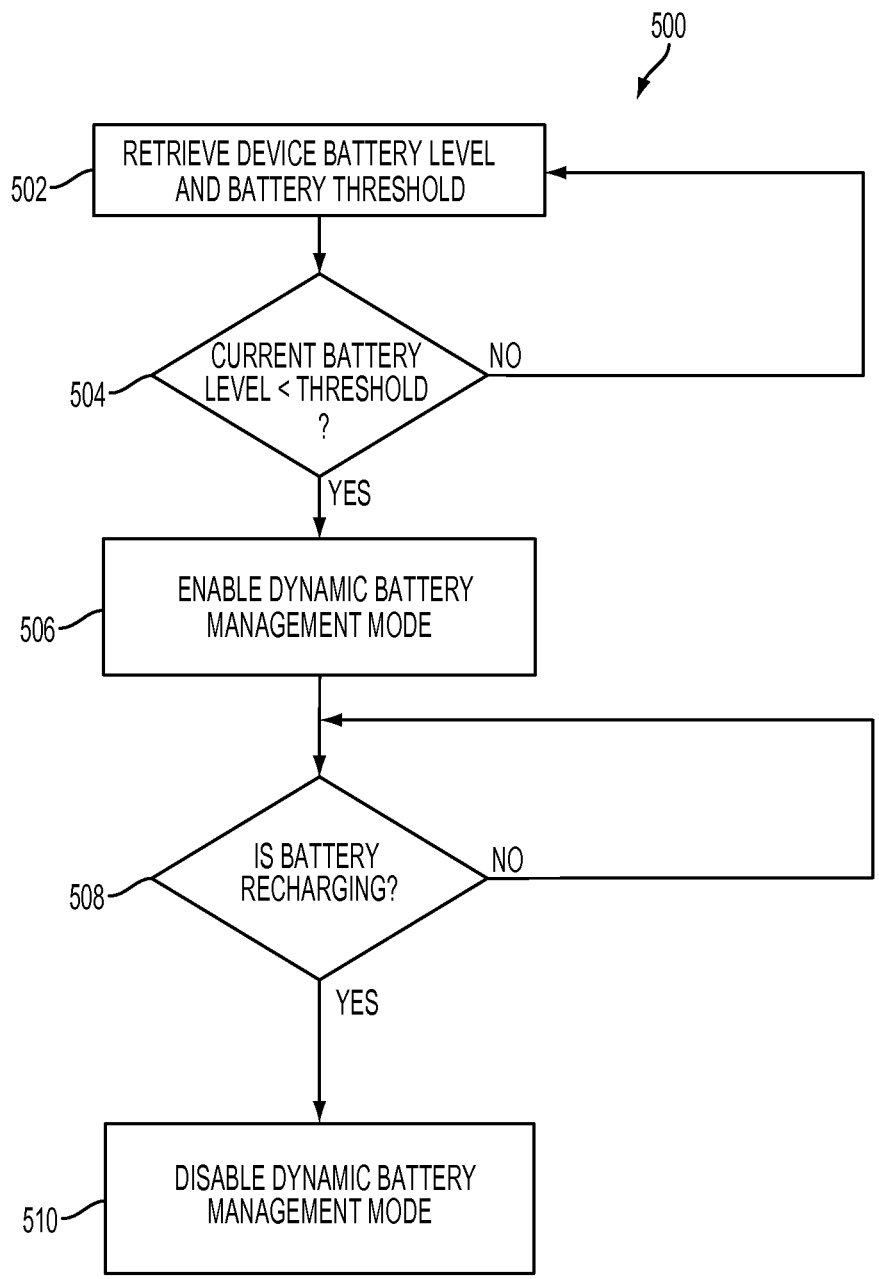
FIG. 5 is an example process for dynamic battery management functionality at a mobile device.

FIG. 5 is a process flowchart of an exemplary method 500 for dynamic battery management functionality of a mobile device. For purposes of discussion, method 500 will be described using system 100 of FIG. 1, as described above, but method 500 is not intended to be limited thereto. The steps of method 500 may be performed by, for example, mobile device 110a of system 100 of FIG. 1 alone, or in some combination with server 140.

As shown in FIG. 5, method 500 begins in step 502, which includes retrieving device battery levels, including battery thresholds, from one or more mobile devices. As an example, battery level may be checked by a battery service associated with a battery driver in a device operating system kernel, where the battery driver interacts with the physical battery. The battery service may monitor battery status, level, temperature and other mobile device parameters and provide such information. An example battery service is discussed further below.

Returning to method 500, battery threshold level for a mobile device is then compared to a device's real-time or current battery level (No, step 504). If it is determined that the device's battery level is greater than or equal to a battery threshold level the method 500 returns to step 502. If it is determined that the current battery level of the mobile device is less than the battery threshold level (Yes, step 504), the device automatically enters a dynamic battery management mode (step 506). In some non-limiting implementations, if it is determined that the current battery level of the mobile device is equal to the battery threshold level, the device automatically enters a dynamic battery management mode.

In an implementation of the dynamic battery management mode, the battery management engine proceeds to control device battery configuration in accordance with application operational priority settings that may have been provided by the user. Such control may be based on configurations provided by a user through a battery management application interface (e.g., interface 410). The battery management engine can be configured to work with a device driver (e.g., WiFi, GPS drivers) for each setting available in the application control screen (e.g., interface 410) and executes appropriate functionality needed to manage battery level on the user's mobile device. For example, an audio driver can be instructed by the battery management engine to terminate a vibration alert mode for the device. In another example, the battery management engine can instruct appropriate drivers to turn off resources such as GPS, WiFi, etc. based on application priority settings. An example battery management engine is discussed further below with reference to FIGS. 6A and 6B.

In some implementations, when a mobile device enters a battery management mode, a user may be provided with a visual notification at the mobile device. An an example, such a notification may include a user interface notification or prompt indicating that the device is about to enter a dynamic battery management mode because the device's battery level threshold has fallen below a pre-defined battery threshold value. The notification may also include an audio warning or sound. Additionally, as discussed above, together with the notification or prompt, the user can be provided with an option to override or cancel initiation of the dynamic battery management mode. In some implementations, a user may be provided with a user interface opetion to temporarily reactivate terminated applications. Temporary reactivation may include, for example, activating a terminated application for a predetermined amount of time (e.g., few minutes) allowing a user to complete a pending task after which the reactivated application may be terminated again.

Method 500 proceeds from step 506 by determining if the device battery is recharging (step 508). As an example, a battery service associated with a battery driver in a device operating system kernel may provide such information.

In an implementation, if it is determined that the battery is recharging (Yes, step 508), the mobile device transitions out of or deactivates the dynamic battery management mode (step 510). In such a regular battery management mode, the battery management engine may return battery management functions back to the device operating system. Furthermore, application hardware resources (e.g., GPS, WiFi) that were previously disabled may be re-enabled automatically or upon user intervention. Returning to method 500, if it is determined that the battery is not recharging (No, step 508), method 500 may continue to check for a battery recharge indication and the device remains in the dynamic battery management mode.

In this way, through the dynamic battery management mode, the user is able to continue use of his or her device for an extended period of time. This results in improved business continuity for the user and the user's organization.

Figure 6A:
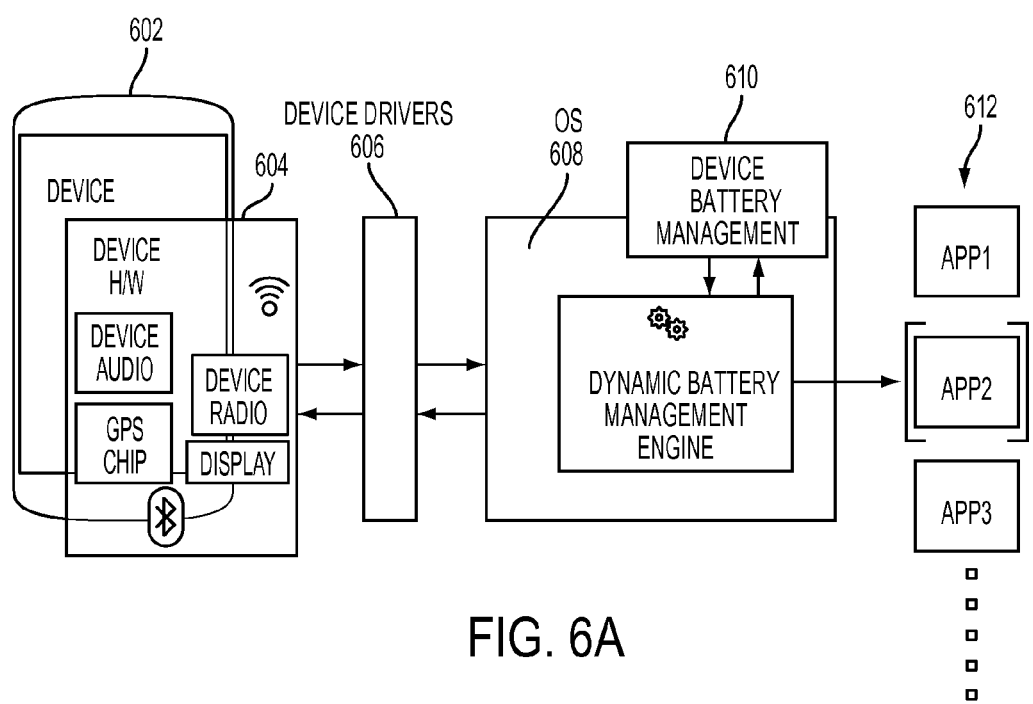
FIGS. 6A and 6B illustrate example logical interface diagrams of mobile device components.
Figure 6B:
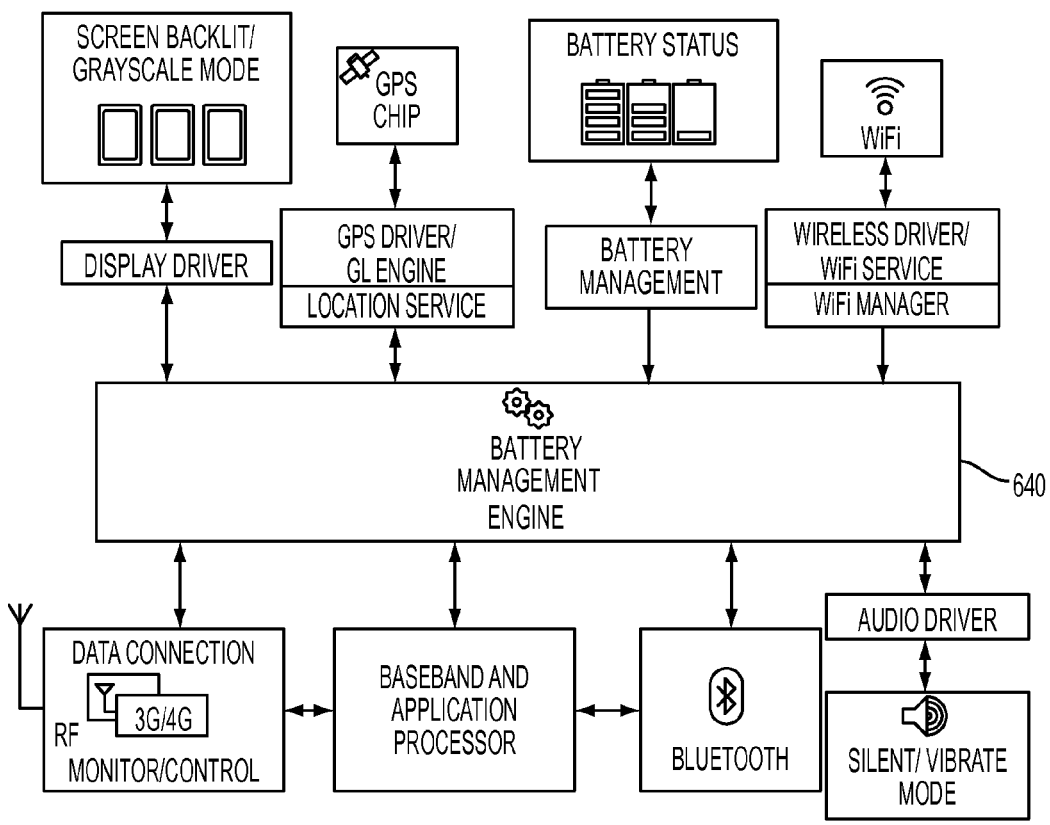

FIG. 6A illustrates an example logical interface diagram 600 that includes example relationships between device 602, device hardware 604, device drivers 606, operating system 608, battery management engine 640, device battery management 610 and applications 612. FIG. 6B illustrates another logical interface diagram that includes battery management engine 640 interacting with various device resources and hardware drivers.

In an implementation, battery management engine 640 can interact with an existing device battery management framework 610 (e.g., Android battery management) to control applications executing on the device. In an aspect of the disclosure, device battery settings are managed by the battery management engine 640.

In a non-limiting example where, the device operating system is Google Android®, the operating system design can be based on a Linux® kernel. The battery management framework 610, such as Android battery management, may be configured as a wrapper to a Linux® battery management framework.

In an implementation, when a mobile device battery level falls below a user-defined threshold, battery management engine 640 shuts down or terminates one or more of applications 612 that may not be identified as priority applications by the user. As discussed above, operational priority values for applications may be configured by a user through example interface 406. Battery management engine 640 then analyzes resource settings for priority applications, connects to device hardware 604 using one or more device drivers 606 and proceeds to manage hardware resources in accordance with resource settings.

For example, and with reference to FIG. 6B, battery management engine 640 can switch off resources such as GPS, Wi-Fi, and Bluetooth etc. by interacting with appropriate device driver hardware. Additionally, in an implementation, when mobile device battery level falls below a user-defined threshold, battery management engine 640 connects to a device grayscale engine converting running applications into a grayscale mode. Gray-scaling, which is discussed further below, enables applications to consume less battery level by reducing the number of bits needed to represent image pixels in application user interfaces.

In this way, battery management engine 640 can be configured to automatically manage the device using battery saving techniques, such as gray-scaling. Furthermore, dynamic battery management and optimal use of device battery is achieved through minimal user intervention. For example, a user can configure the threshold battery level for the device, specify application priority and indicate resource settings for prioritized applications. Then battery management for the device can be handled by the battery management engine (e.g., battery management engine 640) which can automatically manage the device using battery saving techniques.

As mentioned above, gray-scaling, enables applications to consume less battery level. A grayscale digital image can be an image in which the value of each pixel is a single sample, that is, it can carry only intensity information. Images of this category, are generally known as black-and-white images, and are typically composed of shades of gray, varying from black at the weakest intensity to white at the strongest intensity. Converting an image to grayscale can reduce the image size substantially due to a reduction in the number of bits needed to define a pixel. This can reduce time it takes to render the image on the screen, thereby leading to lower battery consumption by a device.

In an implementation, grayscale control may initiate whenever a battery threshold for the device falls below a user-configured value and the device transitions to a dynamic battery management mode where device battery is managed by battery management engine 640. In an implementation, when the battery level falls below a threshold configured by the user in the settings, battery management engine 640 applies automatic gray-scaling on applications executing on the device.

In some implementations, an entire user interface of an application may be grayscaled. In other implementations, only a portion of the user interface of an application may be grayscaled. For example, one or more contiguous regions of pixels may be grayscaled. In yet other implementations, particular pixels (e.g., alternate, corner pixels, or every $n^{th}$ pixel) of the user interface may be grayscaled. In some aspects, particular applications that may not need color to obtain necessary functionality from the applications (e.g., word processing applications) may not be grayscaled.

In an implementation, the gray-scaling process can be image quality aware. In other words, the grayscaling process can maintain image resolution and image quality parameters even after gray-scaling. In an example aspect, a user can configure grayscale settings for an application through application settings 410 illustrated in FIG. 4A. In some implementations, the user may switch an application back to color display when needed.

Figure 7:
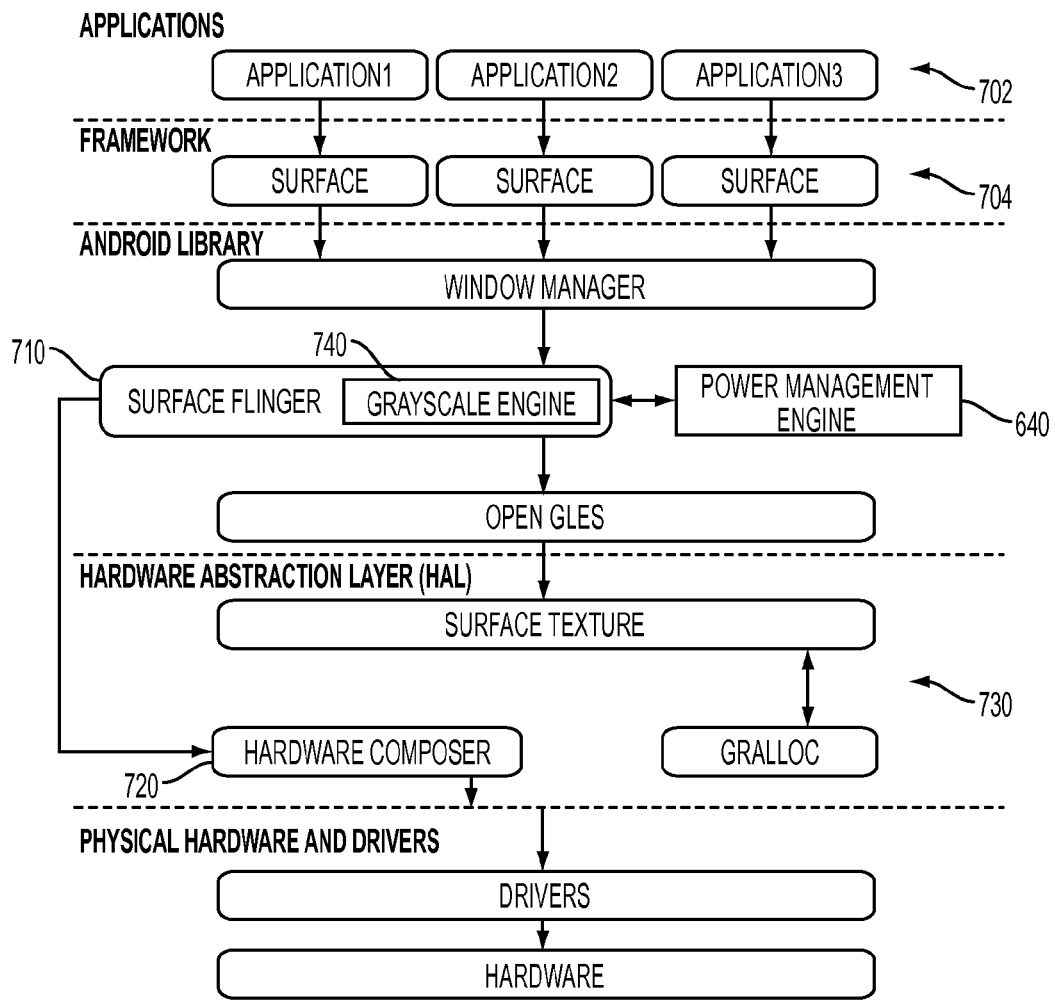
FIG. 7 illustrates an example mobile device operating platform including a grayscale engine.

FIG. 7 illustrates an example mobile device operating platform 700 that includes a grayscale engine 740 in accordance with an implementation. In an implementation, automatic gray-scaling of applications is done by grayscale engine 740. Grayscale engine 740 may reside in the surface flinger 710, and is connected to the battery management engine 640, as shown in FIG. 7. In an implementation, when device battery level goes below a threshold value set by the user, grayscale engine 740 can be invoked by battery management engine 640.

Referring to FIG. 7, an application window 702 created on the platform is backed by a surface 704, and can be, for example, an OpenGL® texture. Surface flinger 710 can be a window compositor (e.g., Android compositor). In an aspect, surface flinger 710 receives content that is to be displayed (e.g., metadata from the Windows® Manager), determines parameters of a resulting content frame and then provides the content frame to be displayed on the screen via a graphic card's EGL interface. Surface flinger 710 is configured to modify the content of the display. Hardware composer 720 in the hardware abstraction layer 730 also assists the surface flinger 710 to compose the surface, thereby reducing the computing efforts by OpenGL.

Grayscale engine 740 may connect to the display driver and transitions executing applications into a grayscale mode. In an implementation, such automatic gray-scaling can be performed by grayscale engine 740 whenever grayscale engine 640 receives information from battery service associated with a battery driver in a device operating system kernel, where the battery driver interacts with the physical battery. As an example, the battery service can monitor battery status, level, temperature and other mobile device parameters and provide such information to grayscale engine 740 and battery management engine 640. In this way, when grayscale engine 740 is invoked, applications executing on the device are gray-scaled. This helps in further reducing the battery consumption.

In some implementations server 140 may remotely provide instructions to grayscale engine 740 to convert one or more pixel values of a user interface of a software application operating on the device to grayscale values. As an example, the instructions can be provided for software applications on the device in order of their increasing operational priority. For example, user interfaces of lower priority applications may be transitioned to grayscale prior to higher priority applications. In some implementations, when a current battery level for a particular device is less than a pre-defined battery threshold, server 140 may retrieve the pixel values of the user interface of the software application, determine if the pixel values of the user interface of the application are substantially identical to one or more grayscale values. If the pixel values are substantially identical to one or more grayscale values, server 140 may not provide instructions to convert the pixel values of the user interface of the application to grayscale values. Otherwise, server 140 can provide instructions to convert the pixel values of the user interface of the application to grayscale values. In some implementations, server 140 may provide instructions to convert the grayscale values back to color pixel values upon detecting that the mobile device is being charged or when a current battery level of the mobile device is greater than a battery threshold.

Figure 8:
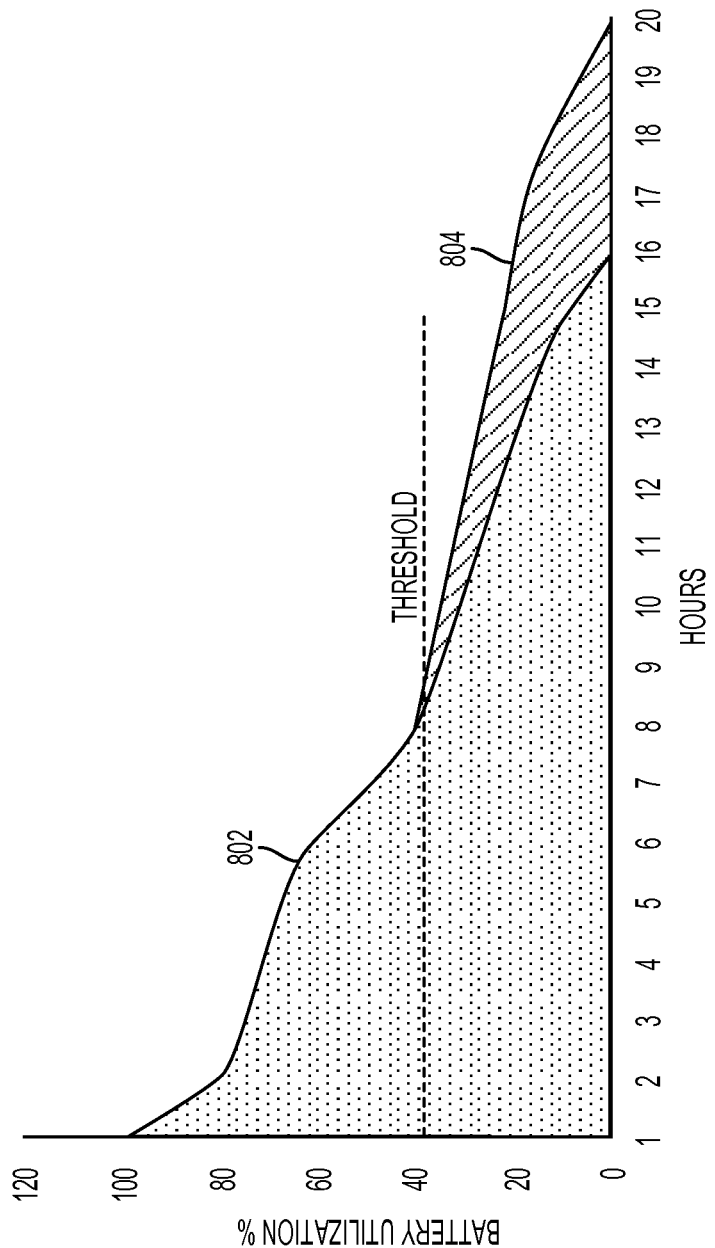
FIG. 8 illustrates an example graphical comparison between different battery management scenarios.

FIG. 8 illustrates an example graphical comparison between a scenario where the battery management engine (e.g., battery management engine 640) is not utilized (graph 802) and another where the battery management engine is utilized (graph 804). Graphs 802 and 804 may be obtained through device memory profiling software. In this example, graph 802 has been generated by monitoring battery consumption of applications that are executing on a device. Graph 804, which represents use of battery management engine 640, has resulted from termination of five applications on the device, where termination of each application has reduced the rate of battery consumption by 5%. Because five applications have been terminated, the total reduction in the rate of battery consumption would be 5 times 5% or 25%.

In graph 802, battery level starts at a level of 100% and as device applications are used through the day, the battery level progressively drops. At 16 hours from initial use, the device loses all battery level and is automatically switched-off or enters a battery-off condition. All applications operating on the device, including business critical applications can be terminated as a result of the battery-off condition.

Graph 804 illustrates changes in battery level after the battery level drops below a user-defined battery threshold of 40%. Once device battery level falls below the 40% threshold, the device automatically enters a dynamic battery management mode where battery level is managed by the battery management engine (e.g., battery management engine 640). In this mode, prioritized applications can be allowed to run in an optimized grayscale mode in accordance with their operational priority values, while non-priority applications are terminated. Resources used by priority applications, such as those defined through user settings (e.g., GPS, Bluetooth, etc.), are terminated in accordance with application operational priority settings.

In this way, the mobile device is able to continue operating for an extended time span in comparison to the scenario (of graph 802) where the battery management engine has not been used. For example, with reference to graph 802, the battery lasts for 16 hours, while in graph 804 battery life has been extended by 4 hours and is able to last for a total of 20 hours. As noted above, because five applications have been terminated in the dynamic battery management mode, the total reduction in the rate of battery consumption would be 5 times 5% or 25%. This translates to a proportional 25% increase in battery life from 16 hours to 20 hours.

Figure 9:
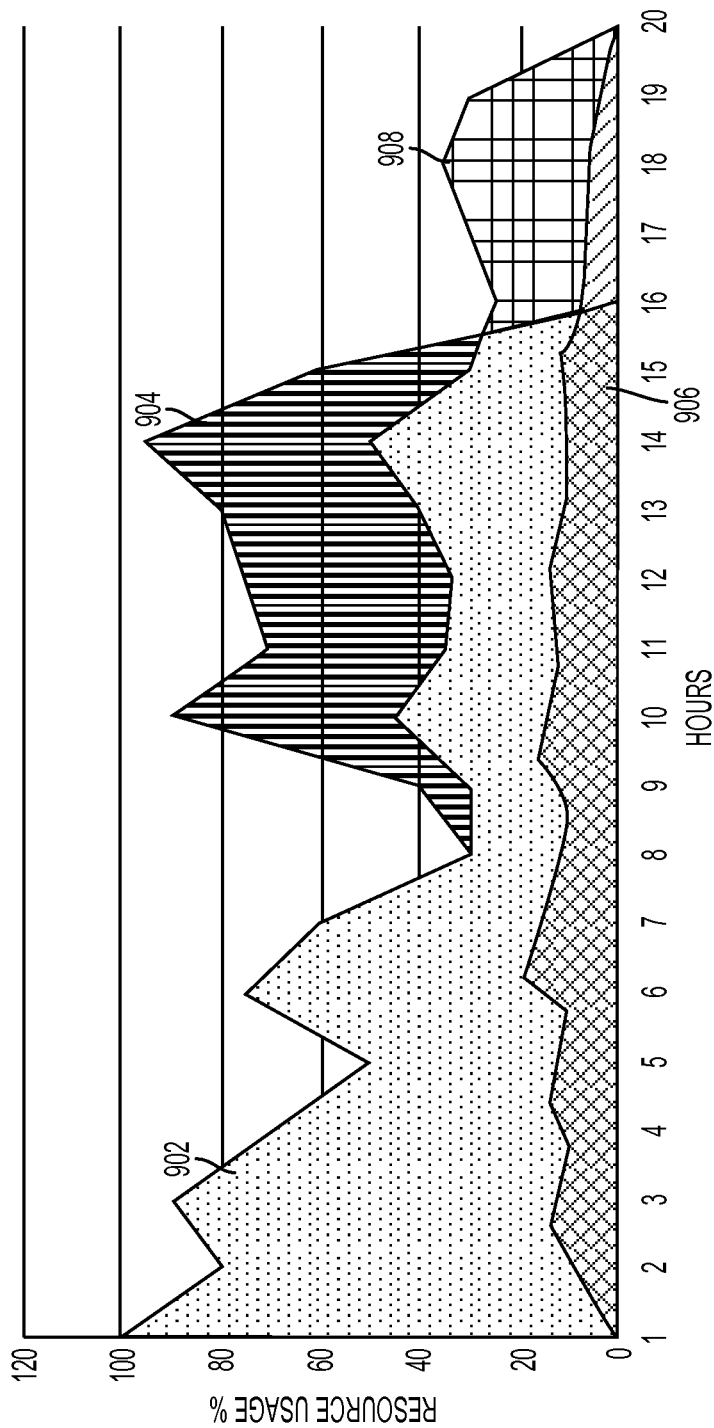
FIG. 9 illustrates example resource utilization behavior graphs for an example mobile device.

FIG. 9 illustrates graph regions 902, 904, 906 and 908 depicting resource utilization behavior for an example device with and without dynamic battery management by a battery management engine. The resource usage patterns of may be generated by a memory profiling tool and may represent resource usage associated with one or more applications on the mobile device Referring to FIG. 9, region 902 represents an initial resource usage pattern of the mobile device beginning at a battery level of 100%. At 8 hours of use without dynamic battery management resource utilization surges as illustrated in region 904. Resource utilization then then rapidly falls when the device is at 16 hours of use. However, with use of dynamic battery management, resource utilization is significantly more balanced after reaching a battery threshold. Consequently, as an example, the device remains operating with battery level for an extended time span of 20 hours as illustrated by region 908. Region 908, which represents use of battery management engine 640, has resulted from automatically termination of five applications on the device, where termination of each application has reduced the rate of battery consumption by 5%. Because five applications have been terminated, the total reduction in the rate of battery consumption would be 5 times 5% or 25%. This translates to a proportional 25% increase in battery life from 16 hours (graph 904) to 20 hours (graph 908). Additionally, the device consumes an amount of battery level for executing the operating system resources, such as phone calls, transmitting text messages etc. as shown in graph region 906.

Figure 10:
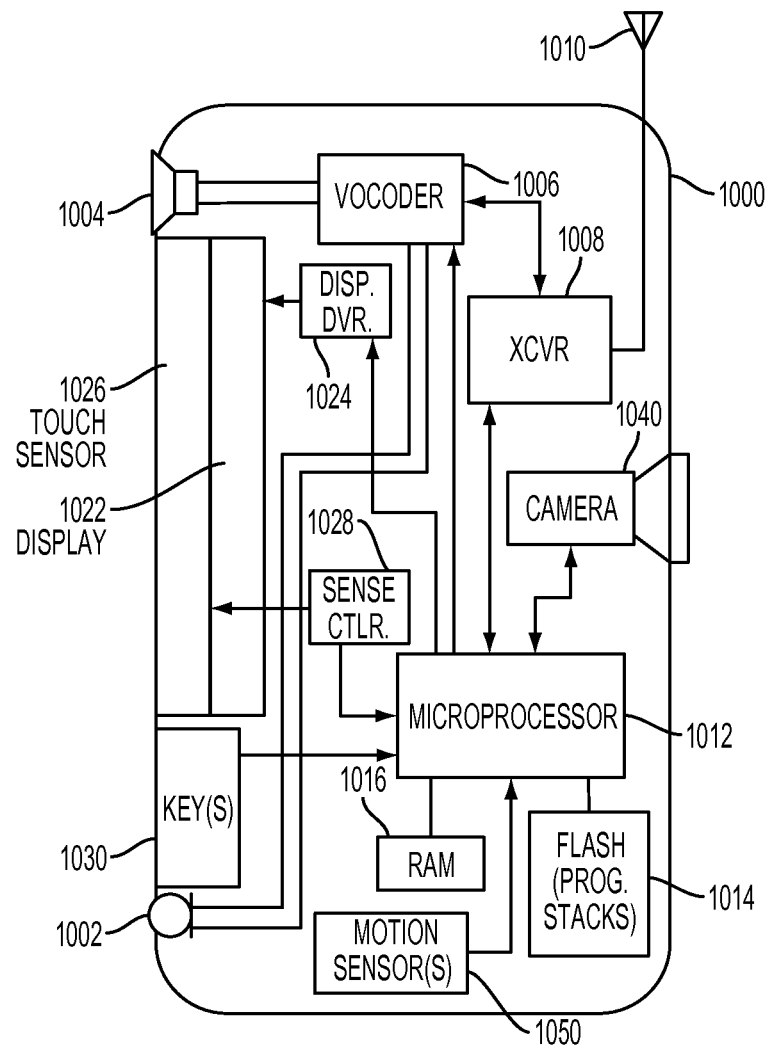
FIG. 10 is a high-level functional block diagram of an example mobile device for practicing an embodiment of the subject technology.

FIG. 10 illustrates a general block diagram of an example mobile device. For illustration purposes, the present teachings will be described below in reference to a touch-screen type mobile device, such as a tablet. In particular, FIG. 10 depicts a touch-screen type mobile device 1000 (e.g., a smart phone device or tablet computer). However, the structure and operation of the touch-screen type mobile device 1000, as will be described in further detail below, is provided by way of example, and the subject technology as described herein is not intended to be limited thereto. It should be appreciated that the disclosed subject matter may be implemented in a non-touch screen type mobile device or in other mobile or portable devices having communication and data processing capabilities. Examples of such mobile devices may include, but are not limited to, net-book computers, tablets, notebook computers and the like. Referring back to FIGS. 1-9, the relevant functional elements/aspects of mobile devices 110*a-c*, respectively, may be implemented using the example mobile device 1000 illustrated in FIG. 10.

For purposes of discussion, FIG. 10 provides a block diagram illustration of an exemplary mobile device 1000 having a touch-screen user interface. As such, mobile device 1000 can be any smart mobile device (e.g., smart-phone or tablet device). Although possible configured somewhat differently, at least logically, a number of the elements of the exemplary touch-screen type mobile device 1000 are similar to the elements of mobile device 1000, and are identified by like reference numbers in FIG. 10. For example, the touch-screen type mobile device 1000 includes a microphone 1002, speaker 1004 and vocoder 1006, for audio input and output functions, much like in the earlier example. The mobile device 1000 also includes a at least one digital transceiver (XCVR) 1008, for digital wireless communications, although the mobile device 1000 may include an additional digital or analog transceiver. The concepts discussed here encompass embodiments of the mobile device 1000 utilizing any digital transceivers that conform to current or future developed digital wireless communication standards. As in mobile device 1000, the transceiver 1008 provides two-way wireless communication of information, such as vocoded speech samples and/or digital information, in accordance with the technology of a network, as described above. The transceiver 1008 also sends and receives a variety of signaling messages in support of the various voice and data services provided via the mobile device 1000 and the communication network. Each transceiver 1008 connects through radio frequency (RF) send and receive amplifiers (not separately shown) to an antenna 1010. The transceiver may also support various types of mobile messaging services, such as short message service (SMS), enhanced messaging service (EMS) and/or multimedia messaging service (MMS).

As in the example of mobile device 1000, a microprocessor 1012 serves as a programmable controller for the mobile device 1000, in that it controls all operations of the mobile device 1000 in accord with programming that it executes, for all general operations, and for operations involved in the procedure for obtaining operator identifier information under consideration here. Mobile device 1000 includes flash type program memory 1014, for storage of various program routines and mobile configuration settings. The mobile device 1000 may also include a non-volatile random access memory (RAM) 1016 for a working data processing memory. Of course, other storage devices or configurations may be added to or substituted for those in the example. Hence, as outlined above, the mobile device 1000 includes a processor, and programming stored in the flash memory 1014 configures the processor so that the mobile device is capable of performing various desired functions, including in this case the functions associated with a client application executing on the mobile device, involved in the techniques for providing battery management services by the carrier.

In the example shown in FIG. 10, the user input elements for mobile device 1000 include a touch-screen display 1022 (also referred to herein as "display screen 1022" or simply, "display 1022") and a keypad including one or more hardware keys 1030. For example, the keypad may be implemented as a sliding keyboard of mobile device 1000 and keys 1030 may correspond to the keys of such a keyboard. Alternatively, the hardware keys 1030 (including keyboard) of mobile device 1000 may be replaced by soft keys presented in an appropriate arrangement on the touch-screen display 1022. The soft keys presented on the touch-screen display 1022 may operate similarly to hardware keys and thus, can be used to invoke the same user interface functions as with the hardware keys.

In general, the touch-screen display 1022 of mobile device 1000 is used to present information (e.g., text, video, graphics or other content) to the user of the mobile device. Touch-screen display 1022 may be, for example and without limitation, a capacitive touch-screen display. In operation, touch-screen display 1022 includes a touch/position sensor 1026 for detecting the occurrence and relative location of user input with respect to the viewable area of the display screen. The user input may be an actual touch of the display device with the user's finger, stylus or similar type of peripheral device used for user input with a touch-screen. Use of such a touch-screen display as part of the user interface enables a user to interact directly with the information presented on the display.

Accordingly, microprocessor 1012 controls display 1022 via a display driver 1024, to present visible outputs to the device user. The touch sensor 1026 is relatively transparent, so that the user may view the information presented on the display 1022. Mobile device 1000 may also include a sense circuit 228 for sensing signals from elements of the touch/position sensor 1026 and detects occurrence and position of each touch of the screen formed by the display 1022 and sensor 1026. The sense circuit 1028 provides touch position information to the microprocessor 1012, which can correlate that information to the information currently displayed via the display 1022, to determine the nature of user input via the screen. The display 1022 and touch sensor 1026 (and possibly one or more keys 1030, if included) are the physical elements providing the textual and graphical user interface for the mobile device 1000. The microphone 1002 and speaker 1004 may be used as additional user interface elements for audio input and output.

In the illustrated example of FIG. 10, the mobile device 1000 also includes a digital camera 1040, for capturing still images and/or video clips. Although digital camera 1040 is shown as an integrated camera of mobile device 1000, it should be noted that digital camera 1040 may be implemented using an external camera device communicatively coupled to mobile device 1000. The user may, for example, operate one or more keys 1030 or provide input via touch sensor 1026 (e.g., via a soft key displayed via the touch-screen display 1022) to take a still image, which essentially activates the camera 1040 to create a digital representation of an optical image visible to the image sensor through the lens of the camera. The camera 1040 supplies the digital representation of the image to the microprocessor 1012, which stores the representation as an image file in one of the device memories. The microprocessor 1012 may also process the image file to generate a visible image output as a presentation to the user on the display 1022, when the user takes the picture or at a later time when the user recalls the picture from device memory. Video images could be similarly processed and displayed. An audio file or the audio associated with a video clip could be decoded by the microprocessor 1012 or the vocoder 1006, for output to the user as an audible signal via the speaker 1004.

In this example, mobile device 1000 also includes one or more motion sensor(s) 1050 for detecting motion input from a user. Examples of motion sensor(s) 1050 include, but are not limited to, an accelerator and/or gyroscope and associated circuitry for signaling microprocessor 1012 in response to detected motion input. The detected motion input may include, for example and without limitation, a change position and/or orientation of the physical device within three-dimensional space (e.g., relative to a predetermined starting point), as described above. Such motion input may also include, for example, a determined rate of change in position and/or orientation of the device. In this way, mobile device 1000 can use motion sensor(s) 1010 to monitor and track the detected motion or physical movement.

As shown by the above discussion, functions relating to dynamic battery management may be implemented on a mobile device of a user, as shown by mobile device 110*a*-*c* and 1000 of FIGS. 1, 2 and 10, respectively, as described above. However, as noted previously, such functions are not limited thereto and therefore, such functions may be implemented using similar types of mobile devices including, for example and without limitation, a personal digital assistant (PDA), handset device or tablet computer equipped with one or more sensors for detecting user input based on one or more predetermined physical gesture(s).

As noted above, the computer as illustrated in the example of FIG. 10 may be a mobile computer with user interface elements, as may be used to implement a laptop, tablet or notebook computer or the like. For example, such a device may include a touch-screen display for user input and output. Alternatively, the device may include a standard light emitting diode (LED) display and, for example, an alphanumeric keypad or T9 keyboard. It is believed that the structure, programming, and general operation of such computing equipment and as a result the drawing should be self-explanatory. As known in the data processing and communications arts, a mobile computer comprises a central processor or other processing device, an internal communication bus, various types of memory or storage media (RAM, ROM, EEPROM, cache memory, disk drives, etc.) for code and data storage, and one or more network interface cards or ports for communication purposes. Also, the mobile computer can further comprise various wireless transceiver modules (or components) such as GPS, Wi-fi, IrDA, Bluetooth, etc. The software functionalities involve programming, including executable code, associated stored data, and graphical user interface code for implementing a client application program at the mobile device. The software code is executable by the processor of the mobile computer. In operation, the code is stored within the mobile computer. At other times, however, the software may be stored at other locations and/or transported for loading into the appropriate mobile computer. Execution of such code by a processor of the mobile computer enables the mobile computer to implement the methodology for a client for requesting access to one or more functions offered by a web application or service, in essentially the manner performed in the implementation discussed and illustrated herein.

Further, the service associated with a client application executable at the mobile device can be implemented in a remote computer (or server) on a network, as described above. That is, a client device (e.g., mobile device) sends information (e.g., a request message) to the remote server for requesting access to a function of a web application hosted at the server; and the remote server processes the request based on the request received from the client and returns an appropriate response (e.g., including application data retrieved from a database) to the client over the network. In the example above, the client device operates as a client terminal and the remote computer as a server in a client-server network environment. While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Figure 11:
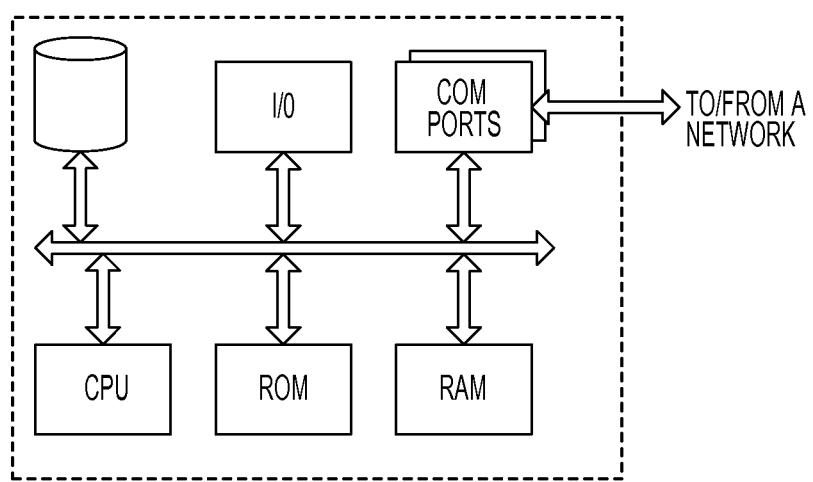
FIG. 11 is a simplified functional block diagram of an example computer that may be configured as a host or server.

FIG. 11 illustrates a high-level functional block diagram of an exemplary network or host computer platform, as may typically be used to implement a server (e.g., any of servers 140, 142 or 144 of FIG. 1, as described above). The general structure, programming and general operation of such computer equipment are well-known and as a result the drawings should be self-explanatory. As shown in the example of FIG. 11, a server includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. In an example, server functions or operations may be implemented in a distributed fashion on a number of similar platforms, to distribute the processing load.

Hence, aspects of method 300 of FIG. 3 involving operations performed by an application or web server, as described above, may be embodied in programming. Similarly, aspects of method 500 of FIG. 5 involving operations performed by a mobile device also may be embodied in programming. Accordingly, program aspects of the technology may be thought of as "products" or "articles of manufacture" typically in the form of executable code or process instructions and/or associated data that is stored on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a mobile device executing a client of a web application to an associated management server or host computer of the web application/service provider or from the management server into the computer platform of the application or web server that will be hosting the web application/service.

Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible storage media, terms such as "computer' or "machine readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the steps of process 300 and 500. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
   determining, for a software application included in a plurality of software applications executing on a device, an operational priority value associated with the software application, the operational priority value manually configured by a user of the device through a user interface presented on the device and allowing the software application to be ranked relative to one or more other software applications included in the plurality of software applications, the one or more other software applications each associated with respective other operational priority values;
   detecting at least one of an increase and a decrease in a level of use of the software application by the user;
   automatically modifying, in response to the detecting of the at least one of the increase and the decrease in the level of use of the software application by the user and based on a resource requirement of the software application operating at the level of use, the operational priority value associated with the software application;
   retrieving a current battery level and a battery threshold of the device;
   comparing the retrieved battery level to the battery threshold; and
   when the current battery level of the device is less than the battery threshold,
      retrieving a set of color pixel values representative of a software user interface associated with the software application,
      determining if one or more color pixel values in the set of color pixel values are substantially identical to one or more grayscale pixel values in a set of grayscale pixel values corresponding to the set of color pixel values, and
      only when the one or more color pixel values are not substantially identical to the one or more grayscale pixel values, making an operational change to the device related to the software application rather than to the one or more other software applications based on the operational priority value of the software application, the operational change comprising converting the one or more color pixel values to the one or more grayscale pixel values to reduce a rate of battery consumption of the device.

2. The method of claim 1, the operational change further comprising:
obtaining a new current battery level of the device; and
when the new current battery level for the device is greater than the battery threshold, reverting from the converted one or more grayscale pixel values to the color pixel values.

3. The method of claim 1, the operational change further comprising:
detecting when the device is in a battery charging state; and
when the device is in the battery charging state, reverting from the converted one or more grayscale pixel values to the color pixel values.

4. The method of claim 1, wherein the one or more color pixel values converted to the one or more grayscale pixel values include all the color pixel values in the set of color pixel values.

5. The method of claim 1, the operational change further comprising:
converting particular regions of contiguous color pixel values of the software user interface to grayscale pixel values.

6. The method of claim 1, the operational change further comprising:
terminating one or more low priority applications executing on the device when the current battery level of the device is less than the battery threshold based on operational priority values of the low priority applications.

7. The method of claim 1, the operational change further comprising:
comparing an operational priority value of a particular software application to respective operational priority values of the other software applications; and
terminating the particular software application prior to the other software applications if the operational priority value of the particular software application is less than each of the respective operational priority values.

8. A server, comprising:
a communication interface configured to enable communication via a mobile network;
a processor coupled with the communication interface;
a storage device accessible to the processor; and
an executable program in the storage device, wherein execution of the program by the processor configures the server to perform functions, including functions to:
determine, for a software application included in a plurality of software applications executing on a device, an operational priority value associated with the software application, the operational priority value manually configured by a user of the device through a user interface presented on the device and allowing the software application to be ranked relative to one or more other software applications included in the plurality of software applications, the one or more other software applications each associated with respective other operational priority values;
detect at least one of an increase and a decrease in a level of use of the software application by the user;
automatically modify, in response to the detecting of the at least one of the increase and the decrease in the level of use of the software application by the user and based on a resource requirement of the software application operating at the level of use, the operational priority value associated with the software application;
retrieve a current battery level and a battery threshold of the device;
compare the retrieved battery level to the battery threshold; and
when the current battery level of the device is less than the battery threshold,
retrieve a set of color pixel values representative of a software user interface associated with the software application,
determine if one or more color pixel values in the set of color pixel values are substantially identical to one or more grayscale pixel values in a set of grayscale pixel values corresponding to the set of color pixel values, and
only when the one or more color pixel values are not substantially identical to the one or more grayscale pixel values, make an operational change to the device related to the software application rather than to the one or more other software applications based on the operational priority value of the software application, the operational change comprising converting the one or more color pixel values to the one or more grayscale pixel values to reduce a rate of battery consumption of the device at least one of software applications executing on the device or displayed on the device.

9. The server of claim 8, the operational change further comprising functions to:
obtain a new current battery level of the device; and
when the new current battery level for the device is greater than the battery threshold, revert from the converted one or more grayscale pixel values to the color pixel values.

10. The server of claim 8, the operational change further comprising functions to:
detect when the device is in a battery charging state; and
when the device is in the battery charging state, revert from the converted one or more grayscale pixel values to the color pixel values.

11. The server of claim 8, wherein the one or more color pixel values converted to the one or more grayscale pixel values include all the color pixel values in the set of color pixel values.

12. The server of claim 8, the operational change further comprising functions to:
convert particular regions of contiguous color pixel values of the software user interface to grayscale pixel values.

13. The server of claim 8, the operational change further comprising functions to:
terminate one or more low priority applications executing on the device when the current battery level of the device is less than the battery threshold based on operational priority values of the low priority applications.

14. The server of claim 8, the operational change further comprising functions to:
compare an operational priority value of a particular software application to respective operational priority values of the other software applications; and
terminate the particular software application prior to the other software applications if the operational priority value of the particular software application is less than each of the respective operational priority values.

15. A non-transitory computer-readable medium comprising instructions which, when executed by one or more computers, cause the one or more computers to:
- determine, for a software application included in a plurality of software applications executing on a device, an operational priority value associated with the software application, the operational priority value manually configured by a user of the device through a user interface presented on the device and allowing the software application to be ranked relative to one or more other software applications included in the plurality of software applications, the one or more other software applications each associated with respective other operational priority values;
- detect at least one of an increase and a decrease in a level of use of the software application by the user;
- automatically modify, in response to the detecting of the at least one of the increase and the decrease in the level of use of the software application by the user and based on a resource requirement of the software application operating at the level of use, the operational priority value associated with the software application;
- retrieve a current battery level and a battery threshold of a device;
- compare the retrieved battery level to the battery threshold; and
- when the current battery level of the device is less than the battery threshold,
  - retrieve a set of color pixel values representative of a software user interface associated with the software application,
  - determine if one or more color pixel values in the set of color pixel values are substantially identical to one or more grayscale pixel values in a set of grayscale pixel values corresponding to the set of color pixel values, and
  - only when the one or more color pixel values are not substantially identical to the one or more grayscale pixel values, make an operational change to the device related to the software application rather than to the one or more other software applications based on the operational priority value of the software application, the operational change comprising converting the one or more color pixel values to the one or more grayscale pixel values to reduce a rate of battery consumption of the device at least one of software applications executing on the device or displayed on the device.

16. The computer readable medium of claim 15, wherein the one or more color pixel values converted to the one or more grayscale pixel values include all the color pixel values in the set of color pixel values.

17. The computer readable medium of claim 15, the operational change further comprising functions to:
- convert particular regions of contiguous color pixel values of the software user interface to grayscale pixel values.

18. The computer readable medium of claim 15, the operational change further comprising functions to:
- obtain a new current battery level of the device; and
- when the new current battery level for the device is greater than the battery threshold, revert from the converted one or more grayscale pixel values to the color pixel values.

* * * * *